US007967369B2

(12) United States Patent
Davidson

(10) Patent No.: US 7,967,369 B2
(45) Date of Patent: Jun. 28, 2011

(54) FOLD-OUT TRAILER

(75) Inventor: Scott Davidson, Racine, WI (US)

(73) Assignee: Awol Outdoors Inc., Somerset, WI (US)

( * ) Notice: Subject to any disclaimer, the term of this patent is extended or adjusted under 35 U.S.C. 154(b) by 237 days.

(21) Appl. No.: 12/150,736

(22) Filed: Apr. 30, 2008

(65) Prior Publication Data
US 2008/0265617 A1    Oct. 30, 2008

Related U.S. Application Data

(60) Provisional application No. 60/915,009, filed on Apr. 30, 2007.

(51) Int. Cl.
*B60P 3/355* (2006.01)
(52) U.S. Cl. .................. 296/173; 296/26.01
(58) Field of Classification Search .......... 296/26.01, 296/26.12, 26.14, 26.15, 172, 173, 156, 165; 280/656, 415.1
See application file for complete search history.

(56) References Cited

U.S. PATENT DOCUMENTS

| 687,807 A | 12/1901 | Winter |
| 1,156,693 A * | 10/1915 | Koger .................. 296/26.01 |
| 1,216,986 A | 2/1917 | Habig |
| 1,243,288 A | 10/1917 | Hall |
| 1,285,794 A | 11/1918 | Reid |
| 1,437,172 A | 11/1922 | Curtiss |
| 1,461,574 A | 7/1923 | Caplan |
| 1,501,790 A | 7/1924 | McClay et al. |
| 1,564,257 A | 12/1925 | Lippman |
| 1,568,895 A | 1/1926 | Lyons |
| 1,595,541 A | 8/1926 | Borah |
| 1,596,924 A | 8/1926 | Curtis |
| 1,826,480 A | 10/1931 | Rappich |
| 1,857,081 A | 5/1932 | Fontaine |
| 2,155,582 A | 4/1939 | Bond |
| 2,248,080 A | 7/1941 | Hathaway |
| 2,459,026 A | 1/1949 | Hardy |
| 2,473,076 A | 6/1949 | Scheibner |
| 2,481,230 A | 9/1949 | MacDonald, Jr. |
| 2,589,416 A * | 3/1952 | Miller .......................... 296/169 |
| 2,632,667 A | 3/1953 | Gray |
| 2,658,212 A | 11/1953 | Green |
| 2,670,986 A * | 3/1954 | Presnell ....................... 296/173 |

(Continued)

FOREIGN PATENT DOCUMENTS

EP    269518 A1 *    6/1988

(Continued)

*Primary Examiner* — H Gutman
(74) *Attorney, Agent, or Firm* — Steven M. Koehler; Westman, Champlin & Kelly, P.A.

(57) ABSTRACT

A fold-out trailer, including a trailer frame, the trailer frame having a tongue joined to a hitch, the tongue being joined to a stationary platform, and the stationary platform having a major surface defining a stationary plane, a plurality of side edges, a front edge and a back edge; at least one primary folding platform, the primary platform having a major surface defining a primary plane, an inside edge, an outside edge, a front edge, and a back edge, the inside edge of the primary platform being joined to one side edge of the stationary platform, the primary platform having a folded position; and a trunk, the trunk defined by the stationary platform, a front cover, and primary platforms when the primary platforms are in the folded position, the trunk having a generally triangular cross-section and being accessible via a back cover.

20 Claims, 5 Drawing Sheets

U.S. PATENT DOCUMENTS

| | | | |
|---|---|---|---|
| 2,719,054 A | 9/1955 | Jennings | |
| 2,876,036 A | 3/1959 | Olson | |
| 2,912,274 A | 11/1959 | Falkner | |
| 3,001,813 A | 9/1961 | Johnson | |
| 3,009,212 A | 11/1961 | Makens | |
| 3,053,563 A | 9/1962 | Green | |
| 3,149,876 A | 9/1964 | Melbye | |
| 3,170,724 A | 2/1965 | Heil | |
| 3,194,251 A | 7/1965 | Pettersen | |
| 3,239,274 A | 3/1966 | Weiss | |
| 3,284,128 A | 11/1966 | Alarie | |
| 3,288,520 A | 11/1966 | Krutzikowsky | |
| 3,348,344 A * | 10/1967 | Tatevossian | 52/22 |
| 3,351,078 A | 11/1967 | Kleiman | |
| 3,371,954 A | 3/1968 | Larsson | |
| 3,394,961 A * | 7/1968 | Matte | 296/169 |
| 3,420,567 A | 1/1969 | Christensen | |
| 3,429,608 A * | 2/1969 | Farnum | 296/173 |
| 3,466,082 A | 9/1969 | Branch | |
| 3,556,581 A * | 1/1971 | Da Silva | 296/173 |
| 3,558,181 A | 1/1971 | Peterson | |
| 3,602,545 A | 8/1971 | Lindenbauer | |
| 3,632,153 A * | 1/1972 | Knudsen | 296/169 |
| 3,652,122 A | 3/1972 | Beauregard | |
| 3,715,141 A * | 2/1973 | Cary | 296/173 |
| 3,737,191 A * | 6/1973 | Fackre | 296/26.15 |
| 3,746,386 A | 7/1973 | Woodward | |
| 3,778,100 A * | 12/1973 | Dillard | 296/164 |
| 3,838,880 A | 10/1974 | Lefebvre | |
| 3,857,211 A * | 12/1974 | Sharpton | 52/65 |
| 3,917,337 A | 11/1975 | Couix | |
| 3,923,335 A | 12/1975 | Erickson | |
| 3,941,414 A | 3/1976 | Platt | |
| 3,971,395 A | 7/1976 | Lipinski | |
| 3,979,133 A | 9/1976 | Morris | |
| 3,992,828 A | 11/1976 | Ohe | |
| 4,047,342 A | 9/1977 | Boulva | |
| 4,055,354 A | 10/1977 | Sharpe | |
| 4,057,284 A | 11/1977 | Blank | |
| 4,063,744 A | 12/1977 | Fraser | |
| 4,112,635 A * | 9/1978 | Rylander | 52/69 |
| 4,113,301 A | 9/1978 | Olmstead | |
| 4,119,224 A | 10/1978 | Moody | |
| 4,126,324 A | 11/1978 | Browning | |
| 4,201,413 A | 5/1980 | Rowe | |
| 4,239,247 A | 12/1980 | Hinz | |
| 4,239,258 A | 12/1980 | Burris | |
| 4,252,136 A | 2/1981 | Kruczynski | |
| 4,358,133 A | 11/1982 | Stucky | |
| 4,362,316 A | 12/1982 | Wright | |
| 4,372,568 A | 2/1983 | Campbell | |
| 4,545,171 A * | 10/1985 | Colvin | 52/79.5 |
| 4,558,713 A | 12/1985 | Hagler et al. | |
| 4,577,876 A | 3/1986 | Harris | |
| 4,633,626 A * | 1/1987 | Freeman et al. | 52/71 |
| 4,682,618 A | 7/1987 | Zwick | |
| 4,696,132 A * | 9/1987 | LeBlanc | 52/69 |
| 4,754,998 A | 7/1988 | LeJuerrne | |
| 4,772,038 A | 9/1988 | MacDonald | |
| 4,786,073 A | 11/1988 | Harper | |
| 4,789,180 A | 12/1988 | Bell | |
| 4,826,235 A | 5/1989 | Zwick | |
| 4,863,212 A | 9/1989 | Jansen | |
| 4,869,517 A | 9/1989 | Smith | |
| 4,869,545 A | 9/1989 | Notermann | |
| 4,938,243 A | 7/1990 | Foster | |
| 4,982,971 A | 1/1991 | Marin | |
| 5,118,245 A | 6/1992 | Dunkel | |
| 5,135,278 A | 8/1992 | Kauffman et al. | |
| 5,152,109 A * | 10/1992 | Boers | 52/143 |
| 5,354,090 A | 10/1994 | Grovom | |
| 5,375,902 A | 12/1994 | Church | |
| 5,462,330 A | 10/1995 | Brown | |
| 5,505,515 A | 4/1996 | Turner | |
| D373,100 S | 8/1996 | Carter | |
| 5,544,944 A | 8/1996 | Keech | |
| 5,558,392 A | 9/1996 | Young | |
| 5,567,003 A | 10/1996 | Gill | |
| 5,570,898 A | 11/1996 | Albert | |
| 5,595,414 A | 1/1997 | Dulnig et al. | |
| 5,596,844 A * | 1/1997 | Kalinowski | 52/79.5 |
| 5,607,176 A | 3/1997 | Leib et al. | |
| D389,785 S | 1/1998 | Guzak | |
| D391,525 S | 3/1998 | Savitski | |
| D391,526 S | 3/1998 | Kass et al. | |
| 5,758,679 A | 6/1998 | Tamburelli | |
| 5,761,854 A | 6/1998 | Johnson et al. | |
| 5,915,400 A | 6/1999 | Pohl et al. | |
| 5,924,836 A | 7/1999 | Kelly | |
| 5,966,956 A * | 10/1999 | Morris et al. | 62/259.1 |
| 5,988,731 A | 11/1999 | Eischen | |
| 6,007,142 A | 12/1999 | Gehman et al. | |
| 6,017,080 A | 1/2000 | Gill | |
| 6,017,081 A | 1/2000 | Colby | |
| 6,042,175 A | 3/2000 | Williams | |
| D422,243 S | 4/2000 | Keirstead | |
| 6,070,372 A * | 6/2000 | Norman et al. | 52/71 |
| 6,102,468 A | 8/2000 | Lowrey et al. | |
| 6,135,526 A | 10/2000 | Reckner, Jr. | |
| 6,161,340 A | 12/2000 | Adams | |
| 6,170,502 B1 | 1/2001 | Pullen | |
| 6,186,580 B1 | 2/2001 | Nothem et al. | |
| 6,203,097 B1 | 3/2001 | Podgorney | |
| 6,217,106 B1 | 4/2001 | Reckner, Jr. | |
| D443,561 S | 6/2001 | Voogt | |
| 6,254,117 B1 | 7/2001 | Cross | |
| 6,283,537 B1 | 9/2001 | DeVore, III | |
| 6,296,297 B1 | 10/2001 | Barrow et al. | |
| D464,916 S | 10/2002 | Golenz et al. | |
| 6,527,336 B2 | 3/2003 | Hernandez et al. | |
| 6,565,139 B2 | 5/2003 | Bayerle et al. | |
| 6,669,269 B1 | 12/2003 | Tran-Ngoc | |
| 6,679,542 B1 | 1/2004 | Semotuk | |
| D486,759 S | 2/2004 | Armstrong | |
| 6,712,414 B2 | 3/2004 | Morrow | |
| 6,712,422 B1 | 3/2004 | Vaillancourt | |
| 6,739,617 B1 | 5/2004 | Martin | |
| 6,746,040 B2 | 6/2004 | Bordeleau et al. | |
| 6,749,252 B2 | 6/2004 | Cervenka | |
| D503,143 S | 3/2005 | Napieraj | |
| D505,361 S | 5/2005 | Arkebauer | |
| 6,959,938 B1 | 11/2005 | Liu | |
| 6,983,567 B2 * | 1/2006 | Ciotti | 52/79.5 |
| 6,994,393 B2 | 2/2006 | Votruba et al. | |
| 6,997,495 B1 * | 2/2006 | Groezinger | 296/26.15 |
| 7,017,975 B2 | 3/2006 | Parmer | |
| D522,921 S | 6/2006 | Rugh et al. | |
| 7,073,816 B1 | 7/2006 | Larson et al. | |
| 7,082,685 B2 | 8/2006 | Crean | |
| 7,165,779 B2 * | 1/2007 | Badger et al. | 280/656 |
| 7,452,000 B2 | 11/2008 | Winter et al. | |
| 7,540,528 B2 | 6/2009 | Spainhower | |
| 7,681,941 B2 * | 3/2010 | Freeman et al. | 296/168 |
| 2001/0026060 A1 | 10/2001 | Cross | |
| 2003/0102655 A1 | 6/2003 | Thompson | |
| 2007/0144078 A1* | 6/2007 | Frondelius | 52/67 |
| 2009/0134605 A1 | 5/2009 | Norton | |
| 2009/0224512 A1 | 9/2009 | Winter et al. | |
| 2010/0066070 A1 | 3/2010 | Scott-Greavu | |

FOREIGN PATENT DOCUMENTS

| | | |
|---|---|---|
| EP | 0269518 B1 | 1/1991 |

* cited by examiner

FOLD-OUT TRAILER

FIELD OF THE INVENTION

The present invention, claiming priority from provisional patent application 60/915,009, filed on Apr. 30, 2007, relates to the field of trailers and more particularly to the field of folding trailers designed for mobile living.

BACKGROUND OF THE INVENTION

Trailers have been used for centuries. Covered wagons, perhaps a more modern form of trailers given the history, provided covered living space during travel. More recent times have rendered the "pop-up" or "fold-out" trailer in which the trailer has a couple positions, a compacted travel position and an expanded use position. Each of these trailers are part of a long existing desire for expandable covered living space presented in a trailer form.

Co-extensive with this development within the trailer field has been the development of renewable and non-renewable energy sources. Early on, fuel consumption was relatively low and concern about over use was not prevalent. As fuel consumption rose and expense of fuel reached new levels, society became interested in being more energy efficient. This trend expanded into an awareness of the need to protect the environment from wasteful uses of fuel. A label applied to this use of fuel in combination with affects on the environment is called "green".

Trailers large in travel profile are at odds with the concept of green. Larger trailers lead to more wind resistance and need for greater use of fuel. Yet, the desire of larger covered living space has not submitted to the need for reduced use of fuel. This intersection of trends, larger covered living space in trailer form, fuel efficiency and now green pose a problem worthy of inventive solutions.

What is needed is a fold-out trailer that expands beyond the dimensions of its predecessor trailers and improves fuel efficiency when in a travel mode. Desirably, the trailer would provide storage space, e.g. a trunk feature, that has access to all available space within the trailer in its folded form. That is, the empty space areas should be congregated and made accessible, avoiding the need to tie travel accessories to the outside of the vehicle or top of the trailer where such items disturb the aerodynamics.

SUMMARY OF THE INVENTION

The present invention is a fold-out trailer that expands beyond the dimensions of its predecessor trailers and improves fuel efficiency when in a travel mode. The trailer provides storage space, e.g. a trunk feature, that has access to all available space within the trailer in its folded form. That is, the empty space areas are congregated and made accessible, avoiding the need to tie travel accessories to the outside of the vehicle or top of the trailer where such items disturb the aerodynamics.

More particularly, the present fold-out trailer, may include a trailer frame, at least one primary folding platform, and a trunk. The trailer frame may having a tongue joined to a hitch and stationary platform. The stationary platform may have a major surface defining a stationary plane, a plurality of side edges, a front edge and a back edge.

The at least one primary folding platform may have a major surface defining a primary plane, an inside edge, an outside edge, a front edge, and a back edge. The inside edge of the primary platform can be joined to one side edge of the stationary platform. The primary platform preferably has a folded position.

The trunk may be defined by the stationary platform, perhaps a front cover, and primary platforms when the primary platforms are in the folded position. The trunk can have a generally triangular cross-section and be accessed via a back cover.

Advantageously, the present invention provides a small profile in its folded, e.g. travel, position, reducing wind resistance and fuel usage.

Also advantageously, the present invention has a trunk feature wherein all empty space is collected in the center of the trailer and accessed through a back cover.

As a further advantage, the trailer provides expanded covered living space when in an extended, e.g., use, position.

These and other advantages will become clear from the below description of the best mode of making and using the present invention.

Figure 1:
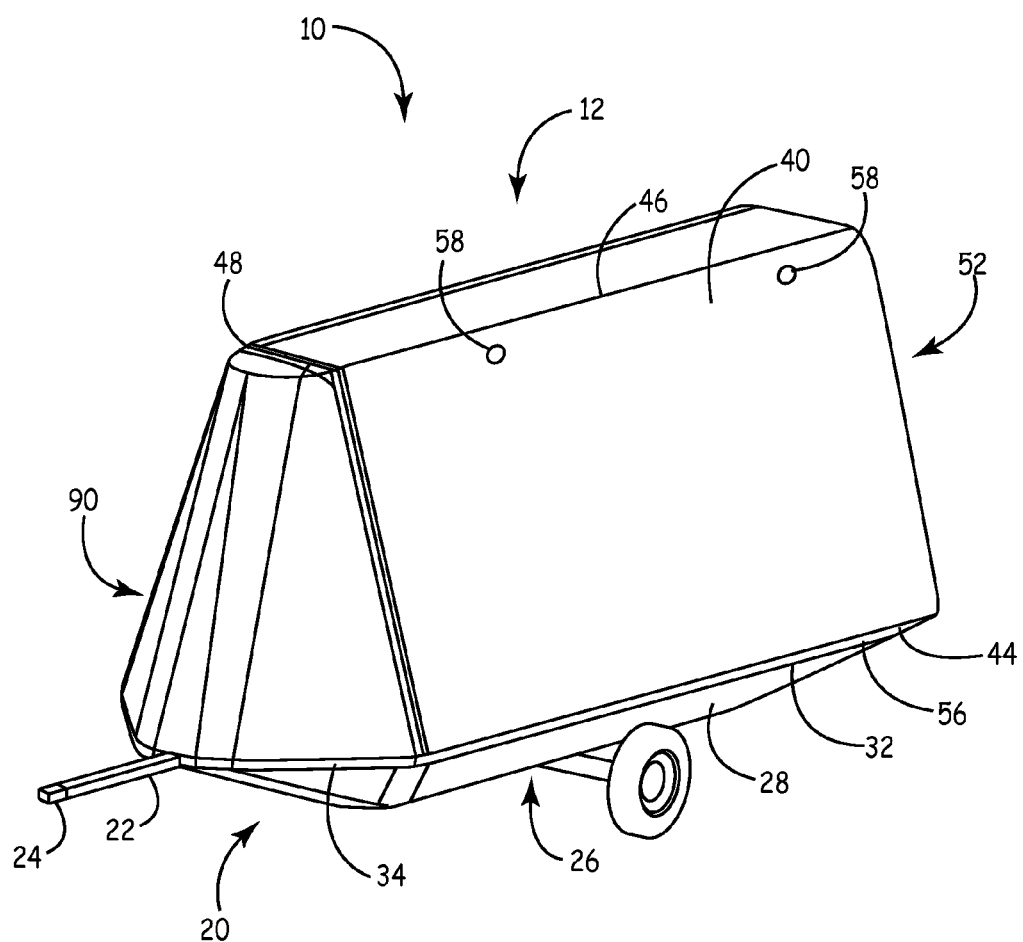
FIG. 1 is a front perspective view of the trailer showing the trailer in a fully folded position.
Figure 2:
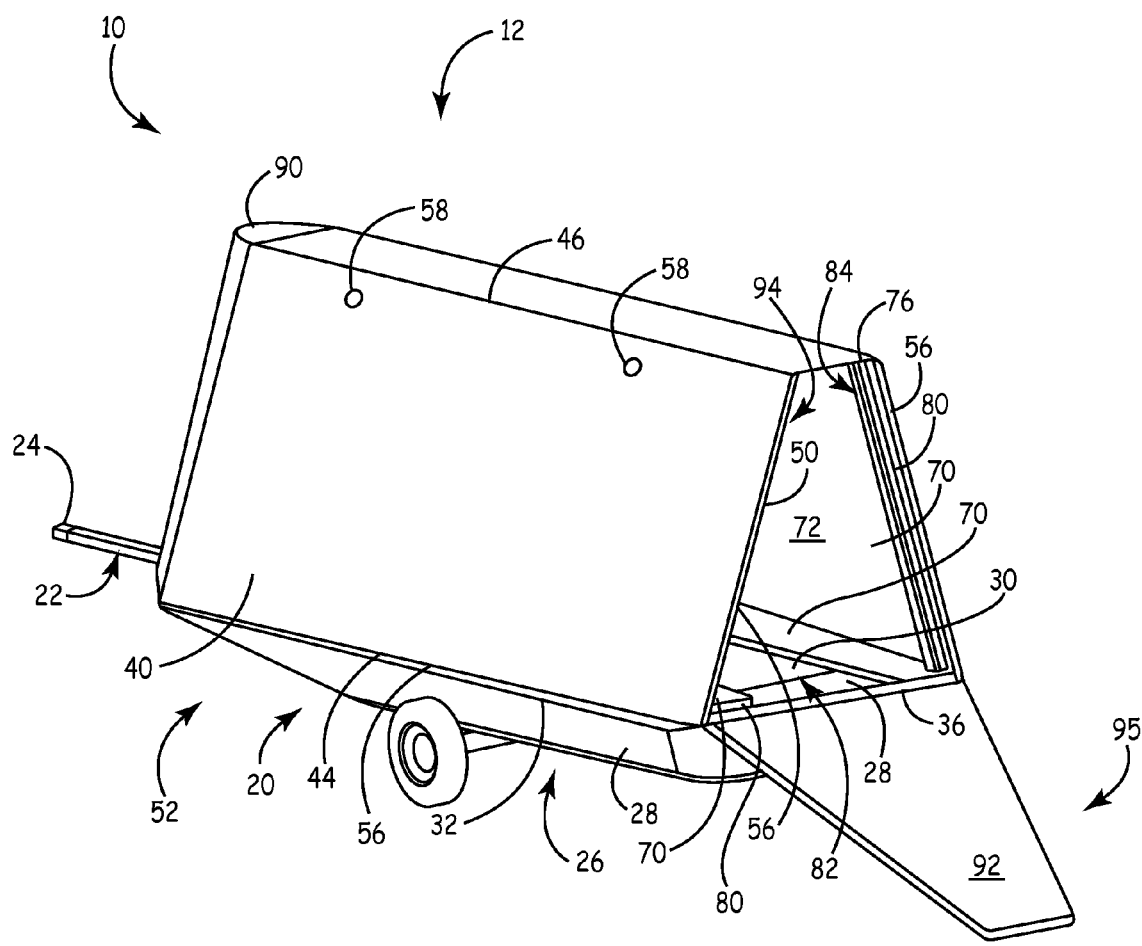
FIG. 2 is a rear perspective view of the trailer showing the trailer in a mostly folded position with the back cover in an extended position.
Figure 3:
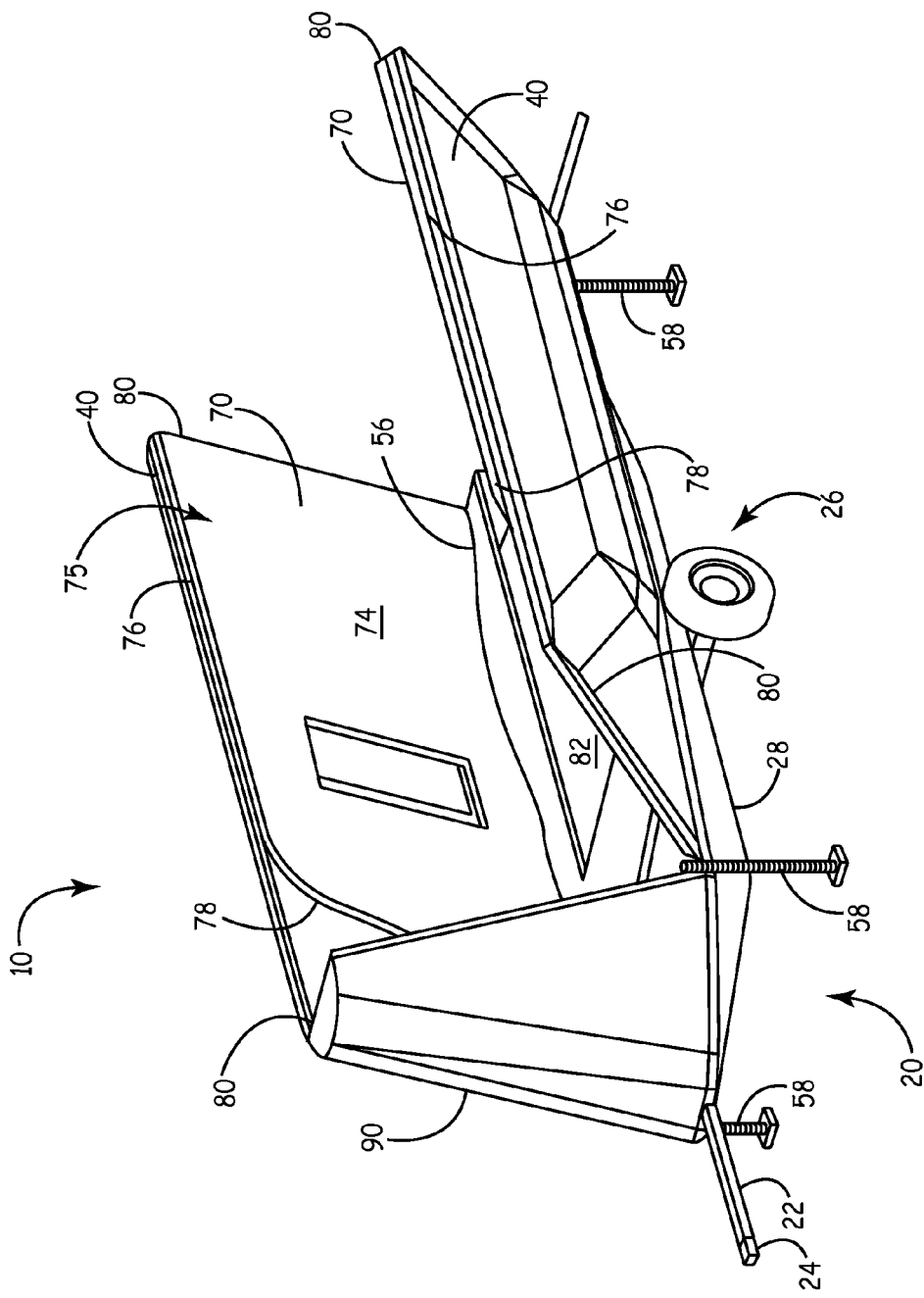
FIG. 3 is a perspective view of the trailer part way between a folded and an extended position.
Figure 4:
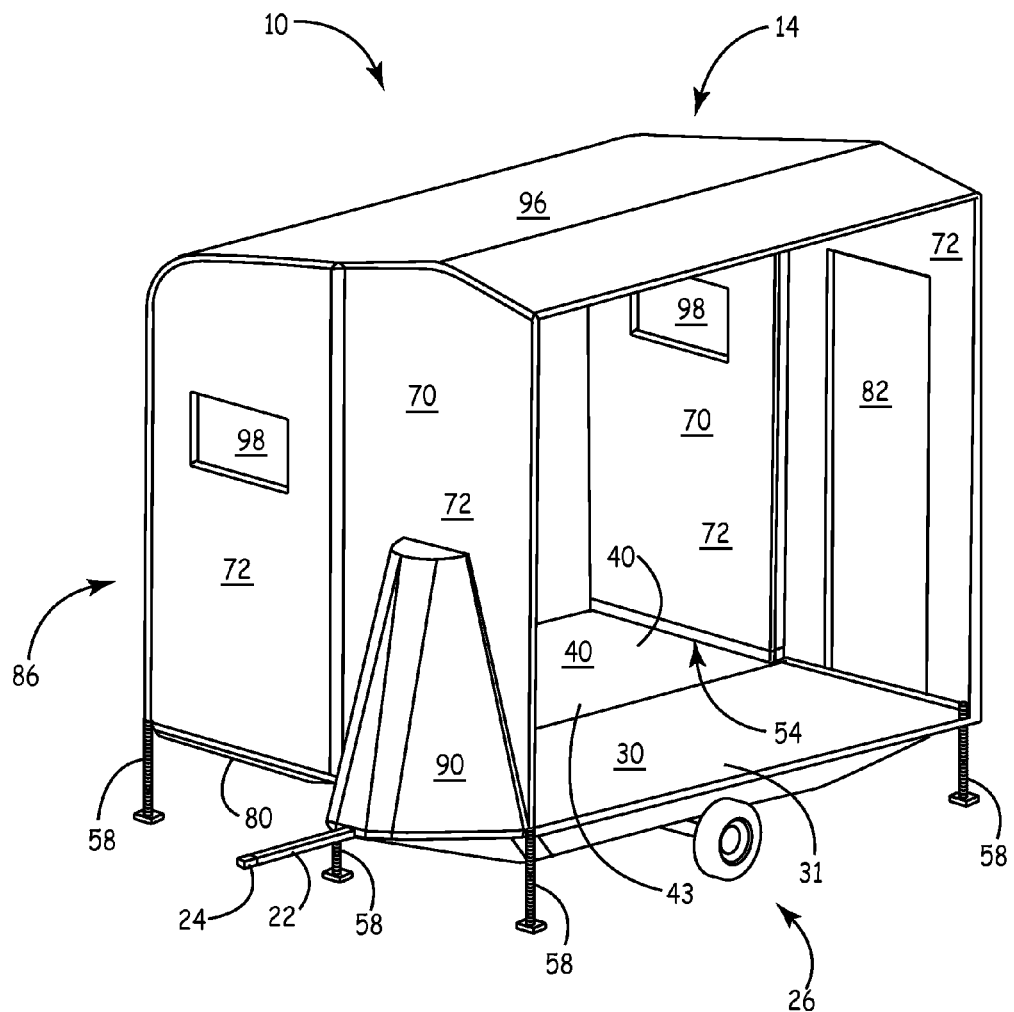
FIG. 4 is a perspective view of the trailer in an extended position with the near side cut away to expose the interior.
Figure 5:
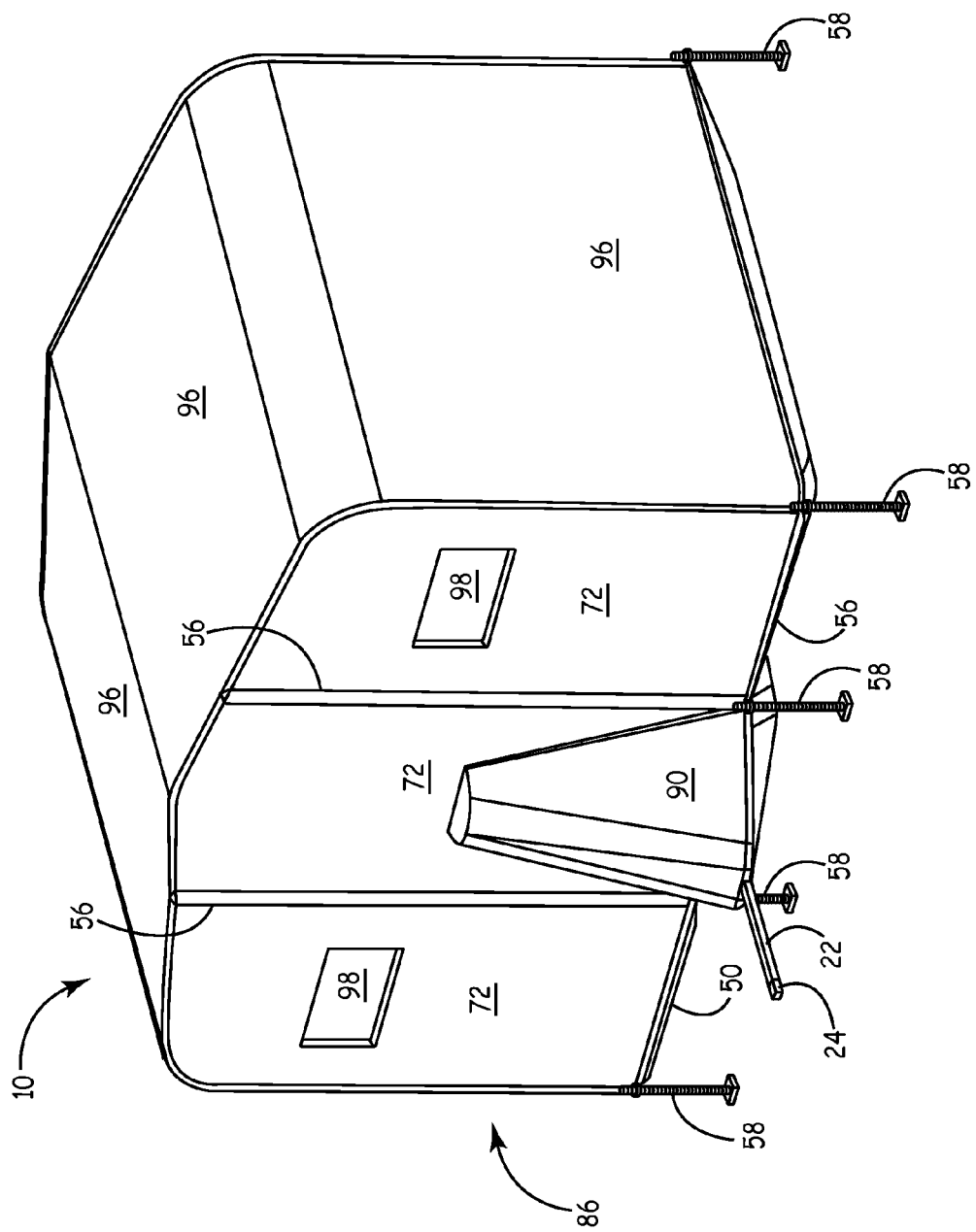
FIG. 5 is the perspective view of FIG. 4 without the portion cut away.

The figures now have been shown and will be described in clear detail enabling one of ordinary skill to make and use the present invention. Modifications can be made without departing from the spirit and scope of the invention.

DETAILED DESCRIPTION OF THE INVENTION

The fold-out trailer 10 as shown in the figures and described herein may include a trailer frame 20, at least one primary folding platform 40, at least one secondary folding platform 70, a front cover 90, a back cover 92, a trunk 94 and a canopy 96. These components cooperatively form a fold-out trailer 10 having a small, environmentally green profile in the folded position 12 and a large covered living area when in the expanded position 14. The components and their interconnects are described below.

The trailer frame 20 may have a tongue 22 joined to a hitch 24. These are intended to be of standard size, strength and materials as are found throughout the field of trailers. The tongue 22 may further be joined to a stationary platform 28, which may be of any material of suitable size and strength. The stationary platform 28 is a portion of the floor when the trailer 10 is in the extended position 14 and as such may be insulated or have a floor covering, such as carpet. The stationary platform 28 has a major surface 30 defining a stationary plane 31, a plurality of side edges 32, a front edge 34 and a back edge 36. The stationary platform 28 may be joined to and supported above an undercarriage 26. Suitable undercarriages include all undercarriages known in the field of trailers. For instance, a wheel and axle arrangement, skis, skates, belts or other configurations may be used.

At least one primary folding platform 40 may have a major surface 42 defining a primary plane 43, an inside edge 44, an outside edge 46, a front edge 48, a back edge 50 and ground supports 58. Preferably, there are two primary platforms 40. The inside edge 44 of the primary platform 40 is desirably joined to one side edge 32 of the stationary platform 28 via a hinge 56. Such hinge 56 may be a stepped-up hinge, adding clearance for the secondary platforms 70. The ground supports 58, joined to the primary platform 40, can be selectively engageable with a ground surface, e.g., dirt, sand, tar, gravel, etc. The primary platform 40 can have a folded position 52 in which the primary plane 43 and stationary plane 31 are skewed planes, e.g., non-parallel or perpendicular. One skilled in the art can see how the angle of the primary plane 43 to the stationary plane directly impacts any "top heavy" issues and trunk size issues. The primary platform 40 has an extended position 54 in which the primary plane 43 and stationary plane 31 are co-planar. That is, the primary platform 40 forms a portion of the floor and as such may be insulated or have floor coverings including carpet as desired. The preferred number of primary platforms is two, one folding on each side of the trailer 10.

While tradition may support the idea that the primary platform 40 should be rectangular in shape, this perhaps is not the "greenest" shape. A curved outside edge 46 can be shaped such that when the primary platform 40 is in the folded position, the trailer 10 takes on more of a tear drop outer profile, increasing fuel efficiency and lessening impact on the environment.

The at least one secondary folding platform 70 may have at least one segment 72 and perhaps windows 98. In a preferred mode there are two secondary platforms 70 and three segments 72 per secondary platform 70. The secondary platforms 70 form rigid sides to the fold-out trailer 10 when in an extended position 14. Each segment 72 can have a major surface 74 defining a segment plane 75, side edges 76, a top edge 78 and a bottom edge 80. Side edges 76 of adjacent segments 72 are preferably joined via a hinge 56. Bottom edges 80 of each segment 72 are preferably joined to one of the stationary platform 28 and the primary platform 40 via a hinge 56, which may be a stepped up hinge as needed. The secondary platform 70 desirably has an extended position 86 in which the segment planes 75 are perpendicular to both the stationary plane 31 and the primary plane 43, when the stationary plane 31 and primary plane 43 are co-planar. The secondary platform 70 has a folded position 84 in which the segment planes 75 are each parallel to one of the primary plane 43 and the stationary plane 31. One or more of the secondary platforms 70 may have a door 82 for human ingress and egress, desirably in alignment with the back cover 92 when the trailer 10 is in the extended position 14.

When the secondary platforms 70 are in an extended position 86, a canopy 96 may be secured to the segments 72. The canopy may further be secured to the primary platform 40 and stationary platform 28. While the canopy 96 may be attached when the secondary platforms 70 are in the folded position 84, such is not necessary. The canopy 96 provides overhead protection from weather elements. Struts or other support structure extending between the secondary platforms 70 may be used to add structural support to the canopy 96. It is intended that the canopy 96 be of a tent fabric known in the art of tents, such as nylon or canvas.

The front cover 90 may be positioned adjacent the tongue 22. The front cover 90 provides an initial wind engaging surface when traveling with the trailer in the folded position 12 and therefore is intended to have an aerodynamic exterior shape. The cover 90 further defines an area for storage, which may include items such as propane tanks. The front cover 90 may engage the stationary platform 28 and primary platform 40 when the primary platforms 40 are in a folded position 52.

The front cover 90 may engage the stationary platform 28 and a secondary platform 70 when the secondary platforms 70 are in an extended position 86. In either platform engagement scenario, an area for storage is defined thereunder.

The back cover 92 preferably engages the stationary platform 28 and preferably is engageable with the primary platform 40 when the primary platforms 40 are in a folded position 52. The back cover 92 encloses the trunk 94, maintaining the contents of the trunk 94 and avoids suction within the trailer during travel. As such, it is desirable that the back cover 92 has an aerodynamic exterior shape. The back cover 92 may engage the stationary platform 28 and a ground surface, such as sand, dirt, water, gravel, vegetation, etc., when the back cover 92 is in an extended position 95. The back cover 92 may be shaped as a ramp for easy loading and unloading of the trunk 94 with wheeled items. Alternatively, the back cover 92 may provide steps to climb into the trailer 10 when in an extended position 14.

The trunk 94 may be defined by the stationary platform 28, front cover 90, back cover 92 and primary platforms 40 when the fold-out trailer 10 is in the folded position 12. The trunk 94 may have a generally triangular cross-section and be accessible via the back cover 92. Notice that the trailer 10 is generally flat, e.g., no substantial air space, when the primary platforms 40 are in the extended position 52 and the secondary platforms 70 are in the folded position 84. Thereafter, moving the primary platforms 40 to the folded position 54 forms the trunk 94 and preferably concentrates all available air space in the center of the trailer 10 where it can be accessed through the back cover 92 as the trunk 94. This arrangement maximizes the trunk space.

In operation, the trailer 10 can be altered between a folded position 12 for travel, and extended position 14 for use. From the folded position 12, the back cover 92, and primary platforms 40 may be moved to the extended positions 95 54 respectively. Supports 58 may engage the ground and primary platforms 40, offering stability to the primary platforms 40. Thereafter, the secondary platforms 70 may be moved to the extended position 86 and canopy 96 installed overhead. Thus, the trailer 10 is in the extended position 14. Ingress and egress may be had through the door 82.

The present invention has been described with reference to the accompanying drawings disclosing the best mode and manner of operation. The claims below define the invention in clear concise terms. While such description has been provided, one skilled in the art will see changes that can be made without departing from the spirit and scope of the invention or the domain justly belonging to the inventor.

I claim:

1. A fold-out trailer, comprising:
   a trailer frame having a hitch;
   a stationary platform joined to the trailer frame and having a major surface defining a stationary plane, a plurality of side edges, a front edge and a back edge;
   a primary platform having a major surface defining a primary plane, an inside edge, an outside edge, a front edge, a back edge, the inside edge being joined to the stationary platform, the primary platform having a folded position in which the primary plane and stationary plane are skewed planes, and the primary platform having an extended position in which the primary plane and stationary plane are co-planar; and
   a secondary platform having two segments, each segment having a major surface defining a segment plane, side edges, a top edge and a bottom edge, the side edges of the segments being joined to each other, the bottom edges of each segment being joined to one of the stationary platform and the primary platform, the secondary platform having an extended position in which the segment planes are perpendicular to both the stationary plane and the primary plane, and the secondary platform having a folded position in which the segment planes are each parallel to one of the primary plane and the stationary plane.

2. The trailer of claim 1 wherein the stationary platform is joined to an undercarriage.

3. A fold-out trailer, comprising:
a trailer frame having a tongue with a hitch;
a stationary platform joined to the trailer frame and having a major surface defining a stationary plane, a plurality of side edges, a front edge and a back edge;
two primary platforms, each primary platform having a major surface defining a primary plane, and having an inside edge, an outside edge, a front edge, and a back edge, the inside edge of the primary platform being joined to one side edge of the stationary platform, the primary platforms having a folded position in which the primary planes are directed toward each other in a primary platform folded position wherein each primary plane is also skewed relative to the stationary plane, and wherein each primary platform is movable outwardly from the primary platform folded position in opposite directions to a primary platform extended position wherein the primary planes face upwardly; and
a plurality of segments, each segment having a segment plane, side edges, a top edge and a bottom edge, wherein each segment is movable from a segment folded position to a segment extended position, wherein in the segment folded position the segment plane is parallel to one of the primary platform or the stationary platform, and wherein in the segment extended position the segment plane is perpendicular to one of the primary platform or the stationary platform.

4. The trailer of claim 3 and further comprising ground supports joined to the primary platform and selectively engageable with a ground surface.

5. The trailer of claim 3 and further comprising:
a canopy engaging the primary platforms and the segments to form an enclosure when the primary platforms are each in the primary platform extended position and each of the segments is in the segment extended position.

6. The trailer of claim 3 and further comprising:
a front cover positioned adjacent to the tongue, the front cover engaging each of the primary platforms when each primary platform is in the primary platform folded position.

7. The trailer of claim 6 wherein the front cover engages at least one of the segments when said at least one segment is in the segment extended position.

8. The trailer of claim 3 and further comprising a back cover, the back cover engaging each of the primary platforms when each of the primary platforms is in the primary platform folded position.

9. The trailer of claim 8 wherein the back cover engages the a ground surface when the back cover is in an extended position.

10. A fold-out trailer, comprising:
a trailer frame having a hitch;
a stationary platform joined to the trailer frame having a major surface defining a stationary plane, two longitudinal side edges, a transverse front edge and a transverse back edge; and
a primary platform having a major surface defining a primary plane, an inside edge, an outside edge, a front edge, and a back edge, the inside edge of the primary platform being joined to one of the longitudinal side edges of the stationary platform, the primary platform having an extended position parallel to the stationary platform thereby forming an extended surface to act as a floor and being pivotal to a folded position wherein the primary plane is skewed relative to the stationary plane;
a segment joined to the primary platform, the segment having a major surface defining a segment plane, and having two longitudinal side edges, a transverse top edge and a transverse bottom edge and wherein the transverse bottom edge of the segment is pivotally connected to one of the front edge or the back edge of the primary platform, wherein the segment has an extended position where the segment plane is perpendicular to the primary plane to act as a wall when the primary platform is parallel to the stationary platform, and wherein the segment is pivotal to a folded position where the segment plane is parallel to the primary plane when the primary plane is skewed relative to the stationary plane.

11. The trailer of claim 10 and further comprising:
a second primary platform having a major surface defining a primary plane, and having an inside edge, an outside edge, a front edge, and a back edge, the inside edge of the second primary platform being joined to one longitudinal side edge of the stationary platform opposite the first-mentioned primary platform, the second primary platform having an extended position parallel to the stationary platform thereby forming an extended surface to act as a floor and being pivotal to a folded position wherein the primary plane of the second primary platform is skewed relative to the stationary plane;
a second segment joined to the second primary platform, the second segment having a major surface defining a segment plane, two longitudinal side edges, a transverse top edge and a transverse bottom edge and wherein the transverse bottom edge of the second segment is pivotally connected to one of the front edge or the back edge of the second primary platform, wherein the second segment has an extended position where the segment plane of the second segment is perpendicular to the primary plane of the second primary platform to act as a wall when the second primary platform is parallel to the stationary platform, and wherein the second segment is pivotal to a folded position where the segment plane of the second segment is parallel to the primary plane of the second primary plane when the primary plane of the second primary plane is skewed relative to the stationary plane.

12. The trailer of claim 11 and further comprising:
a third segment joined to the first-mentioned primary platform, the third segment having a major surface defining a segment plane, and having two longitudinal side edges, a transverse top edge and a transverse bottom edge and wherein the transverse bottom edge of the third segment is pivotally connected to one of the front edge or the back edge of the first-mentioned primary platform opposite the first-mentioned segment, wherein the third segment has an extended position where the segment plane of the third segment is perpendicular to the primary plane of the first-mentioned primary platform to act as a wall when the first-mentioned primary platform is parallel to the stationary platform, and wherein the third segment is pivotal to a folded position where the segment plane of the third segment is parallel to the primary plane of the first-mentioned primary plane when the primary plane of the first-mentioned primary plane is skewed relative to the stationary plane; and a fourth segment joined to the second primary platform, the fourth segment having a major surface defining a segment plane, and having two longitudinal side edges, a transverse top edge and a transverse bottom edge and wherein the transverse bottom edge of the fourth segment is pivotally connected to one of the front edge or the back edge of the second primary platform opposite the second segment, wherein the fourth segment has an extended position where the segment plane of the fourth segment is perpendicular to the primary plane of the second primary platform to act as a wall when the second primary platform is parallel to the stationary platform, and wherein the forth segment is pivotal to a folded position where the segment plane of the fourth segment is parallel to the primary plane of the second primary plane when the primary plane of the second primary plane is skewed relative to the stationary plane.

13. The trailer of claim 11 and further comprising:

a fifth segment joined to the stationary platform, the fifth segment having a major surface defining a segment plane, and having two longitudinal side edges, a transverse top edge and a transverse bottom edge and wherein the transverse bottom edge of the fifth segment is pivotally connected to the front edge the stationary platform, wherein the fifth segment has an extended position where the segment plane of the fifth segment is perpendicular to the stationary plane to act as a wall when the primary platforms are each in the corresponding extended position, and wherein the fifth segment is pivotal to a folded position where the segment plane of the fifth segment is parallel to the stationary plane when each of the primary platforms are in the corresponding folded position; and a sixth segment joined to the stationary platform, the sixth segment having a major surface defining a segment plane, and having two longitudinal side edges, a transverse top edge and a transverse bottom edge and wherein the transverse bottom edge of the sixth segment is pivotally connected to the back edge of the stationary platform, wherein the sixth segment has an extended position where the segment plane of the sixth segment is perpendicular to the stationary plane to act as a wall when the primary platforms are each in the corresponding extended position, and wherein the sixth segment is pivotal to a folded position where the segment plane of the sixth segment is parallel to the stationary plane when each of the primary platforms are in the corresponding folded position.

14. The trailer of claim 13 wherein a first longitudinal side edge of the longitudinal side edges of the fifth segment is joined to a longitudinal side edge of the longitudinal side edges of the first-mentioned segment and a second longitudinal side edge of the longitudinal side edges of the fifth segment is joined to a longitudinal side edge of the longitudinal side edges of the second segment.

15. The trailer of claim 14 wherein a first longitudinal side edge of the longitudinal side edges of the sixth segment is joined to a longitudinal side edge of the longitudinal side edges of the third segment and a second longitudinal side edge of the longitudinal side edges of the sixth segment is joined to a longitudinal side edge of the longitudinal side edges of the fourth segment.

16. The trailer of claim 15 wherein hinges are used to join each of the first-mentioned and second segments to the fifth segment.

17. The trailer of claim 16 wherein hinges are used to join each of the third and fourth segments to the sixth segment.

18. The trailer of claim 17 and further comprising a fabric canopy removably joined to at least some of the segments and the primary platforms to form a roof of an enclosure.

19. The trailer of claim 13 and further comprising a fabric canopy removably joined to at least some of the segments and the primary platforms to form a roof of an enclosure.

20. The trailer of claim 19 wherein the sixth segment includes a door allowing access to the enclosure.

* * * * *